US012549209B2

(12) United States Patent
Uziel et al.

(10) Patent No.: US 12,549,209 B2
(45) Date of Patent: Feb. 10, 2026

(54) TECHNIQUES FOR TRANSMITTING DIGITAL PRE-DISTORTION INFORMATION

(71) Applicant: QUALCOMM Incorporated, San Diego, CA (US)

(72) Inventors: Lior Uziel, Hod Hasharon (IL); Gideon Shlomo Kutz, Ramat Hasharon (IL); Assaf Touboul, Netanya (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 18/192,207

(22) Filed: Mar. 29, 2023

(65) Prior Publication Data

US 2023/0361794 A1 Nov. 9, 2023

Related U.S. Application Data

(60) Provisional application No. 63/364,262, filed on May 5, 2022.

(51) Int. Cl.
*H04B 1/04* (2006.01)
*H04W 72/11* (2023.01)
*H04W 72/21* (2023.01)

(52) U.S. Cl.
CPC .......... *H04B 1/0475* (2013.01); *H04W 72/11* (2023.01); *H04W 72/21* (2023.01); *H04B 2001/0425* (2013.01)

(58) Field of Classification Search
CPC ........ H04B 1/04; H04B 1/0475; H04B 1/006; H04B 7/06952; H04B 1/3822; H04B 2001/0425; H04L 5/0053; H04L 5/0048; H04L 25/03343; H04L 27/366; H03F 1/3241; H03F 3/189; H03F 3/24; H04W 72/11; H04W 72/21; H04W 88/06
See application file for complete search history.

(56) References Cited

U.S. PATENT DOCUMENTS

| 10,637,515 B2 * | 4/2020 | Kutz | H04B 1/006 |
|---|---|---|---|
| 10,707,907 B2 * | 7/2020 | Sagi | H04B 1/109 |
| 11,245,428 B2 * | 2/2022 | Gutman | H04W 72/54 |
| 11,290,138 B1 | 3/2022 | Kutz | |
| 11,296,735 B1 * | 4/2022 | Kutz | H04B 1/0475 |
| 11,903,011 B2 * | 2/2024 | Gutman | H04W 72/542 |
| 2019/0190552 A1 | 6/2019 | Sagi et al. | |

(Continued)

OTHER PUBLICATIONS

International Search Report and Written Opinion—PCT/US2023/016924—ISA/EPO—Jun. 26, 2023.

(Continued)

*Primary Examiner* — Frank Duong
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive, from a network entity, a reference signal. The UE may transmit, to the network entity and via a feedback channel, digital pre-distortion (DPD) information that is based at least in part on the reference signal, wherein the DPD information indicates an estimate of non-linearities of a power amplifier at the network entity based at least in part on the reference signal. Numerous other aspects are described.

30 Claims, 8 Drawing Sheets

(56) References Cited

U.S. PATENT DOCUMENTS

| | | | |
|---|---|---|---|
| 2021/0328609 A1* | 10/2021 | Gutman | H03F 3/24 |
| 2023/0014042 A1* | 1/2023 | Barak | H04L 5/0048 |
| 2023/0179238 A1* | 6/2023 | Kutz | H04W 4/06 |
| | | | 375/297 |

OTHER PUBLICATIONS

Qualcomm Incorporated: "Network Energy Saving Techniques", 3GPP TSG RAN WG1 #109-e, R1-2205046, 3rd Generation Partnership Project (3GPP), Mobile Competence Centre, 650, Route Des Lucioles, F-06921, Sophia-Antipolis Cedex, France, vol. RAN WG1, No. e-Meeting, May 9-May 20, 2022, Apr. 29, 2022, 19 Pages, XP052191708, 5.1 OTA DPD, Figure 10, paragraph [0002].

* cited by examiner

TECHNIQUES FOR TRANSMITTING DIGITAL PRE-DISTORTION INFORMATION

CROSS-REFERENCE TO RELATED APPLICATION

This Patent application claims priority to U.S. Provisional Patent Application No. 63/364,262, filed on May 5, 2022, entitled "TECHNIQUES FOR TRANSMITTING DIGITAL PRE-DISTORTION INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for transmitting digital pre-distortion (DPD) information.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spect/Madhu Ramanujam, Reg. No. 66,524/ral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, a method of wireless communication performed by a user equipment (UE) includes receiving, from a network entity, a channel state information reference signal (CSI-RS); and transmitting, to the network entity and via a feedback channel, digital pre-distortion (DPD) information that is based at least in part on the CSI-RS, wherein the DPD information indicates an estimate of non-linearities of a power amplifier at the network entity based at least in part on the CSI-RS.

In some implementations, a method of wireless communication performed by a network entity includes transmitting, to a UE, a CSI-RS; and receiving, from the UE and via a feedback channel, DPD information that is based at least in part on the CSI-RS, wherein the DPD information indicates an estimate of non-linearities of a power amplifier at the network entity based at least in part on the CSI-RS.

In some implementations, an apparatus for wireless communication at a UE includes a memory and one or more processors, coupled to the memory, configured to: receive, from a network entity, a CSI-RS; and transmit, to the network entity and via a feedback channel, DPD information that is based at least in part on the CSI-RS, wherein the DPD information indicates an estimate of non-linearities of a power amplifier at the network entity based at least in part on the CSI-RS.

In some implementations, an apparatus for wireless communication at a network entity includes a memory and one or more processors, coupled to the memory, configured to: transmit, to a UE, a CSI-RS; and receive, from the UE and via a feedback channel, DPD information that is based at least in part on the CSI-RS, wherein the DPD information indicates an estimate of non-linearities of a power amplifier at the network entity based at least in part on the CSI-RS.

In some implementations, a non-transitory computer-readable medium storing a set of instructions for wireless communication includes one or more instructions that, when executed by one or more processors of a UE, cause the UE to: receive, from a network entity, a CSI-RS; and transmit, to the network entity and via a feedback channel, DPD information that is based at least in part on the CSI-RS, wherein the DPD information indicates an estimate of non-linearities of a power amplifier at the network entity based at least in part on the CSI-RS.

In some implementations, a non-transitory computer-readable medium storing a set of instructions for wireless communication includes one or more instructions that, when executed by one or more processors of a network entity, cause the network entity to: transmit, to a UE, a CSI-RS; and receive, from the UE and via a feedback channel, DPD information that is based at least in part on the CSI-RS, wherein the DPD information indicates an estimate of non-linearities of a power amplifier at the network entity based at least in part on the CSI-RS.

In some implementations, an apparatus for wireless communication includes means for receiving, from a network entity, a CSI-RS; and means for transmitting, to the network entity and via a feedback channel, DPD information that is based at least in part on the CSI-RS, wherein the DPD information indicates an estimate of non-linearities of a power amplifier at the network entity based at least in part on the CSI-RS.

In some implementations, an apparatus for wireless communication includes means for transmitting, to a UE, a CSI-RS; and means for receiving, from the UE and via a feedback channel, DPD information that is based at least in part on the CSI-RS, wherein the DPD information indicates an estimate of non-linearities of a power amplifier at the apparatus based at least in part on the CSI-RS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
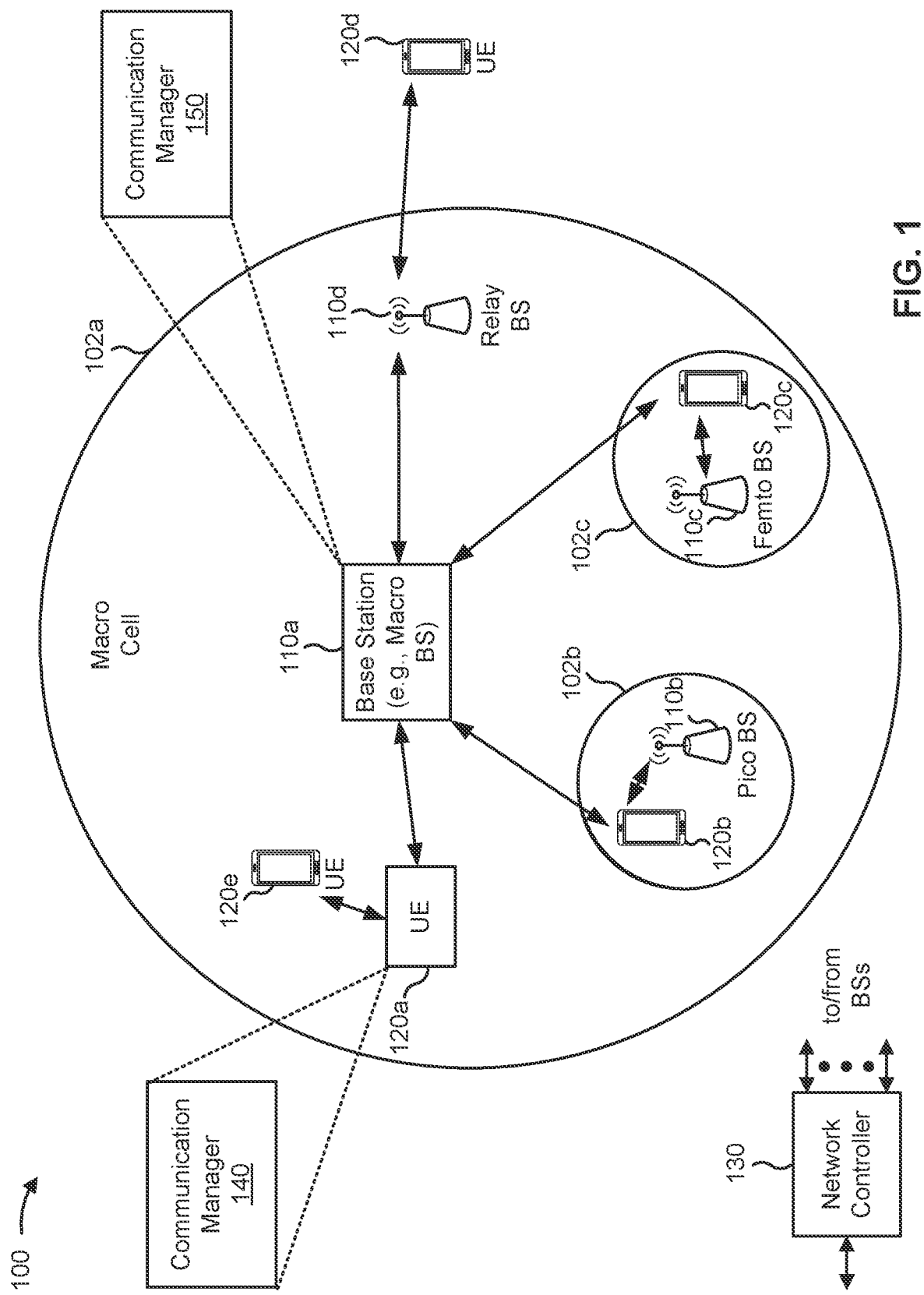
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicleto-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network entity, a channel state information reference signal (CSI-RS); and transmit, to the network entity and via a feedback channel, digital pre-distortion (DPD) information that is based at least in part on the CSI-RS, wherein the DPD information indicates an estimate of non-linearities of a power amplifier at the network entity based at least in part on the CSI-RS. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit, to a UE, a CSI-RS; and receive, from the UE and via a feedback channel, DPD information that is based at least in part on the CSI-RS, wherein the DPD information indicates an estimate of non-linearities of a power amplifier at the network entity based at least in part on the CSI-RS. Additionally, or alternatively, the communication manager 150 may perform one or more other operations described herein.

As indicated above, FIG. 1 is provided as an example. Other examples may differ from what is described with regard to FIG. 1.

Figure 2:
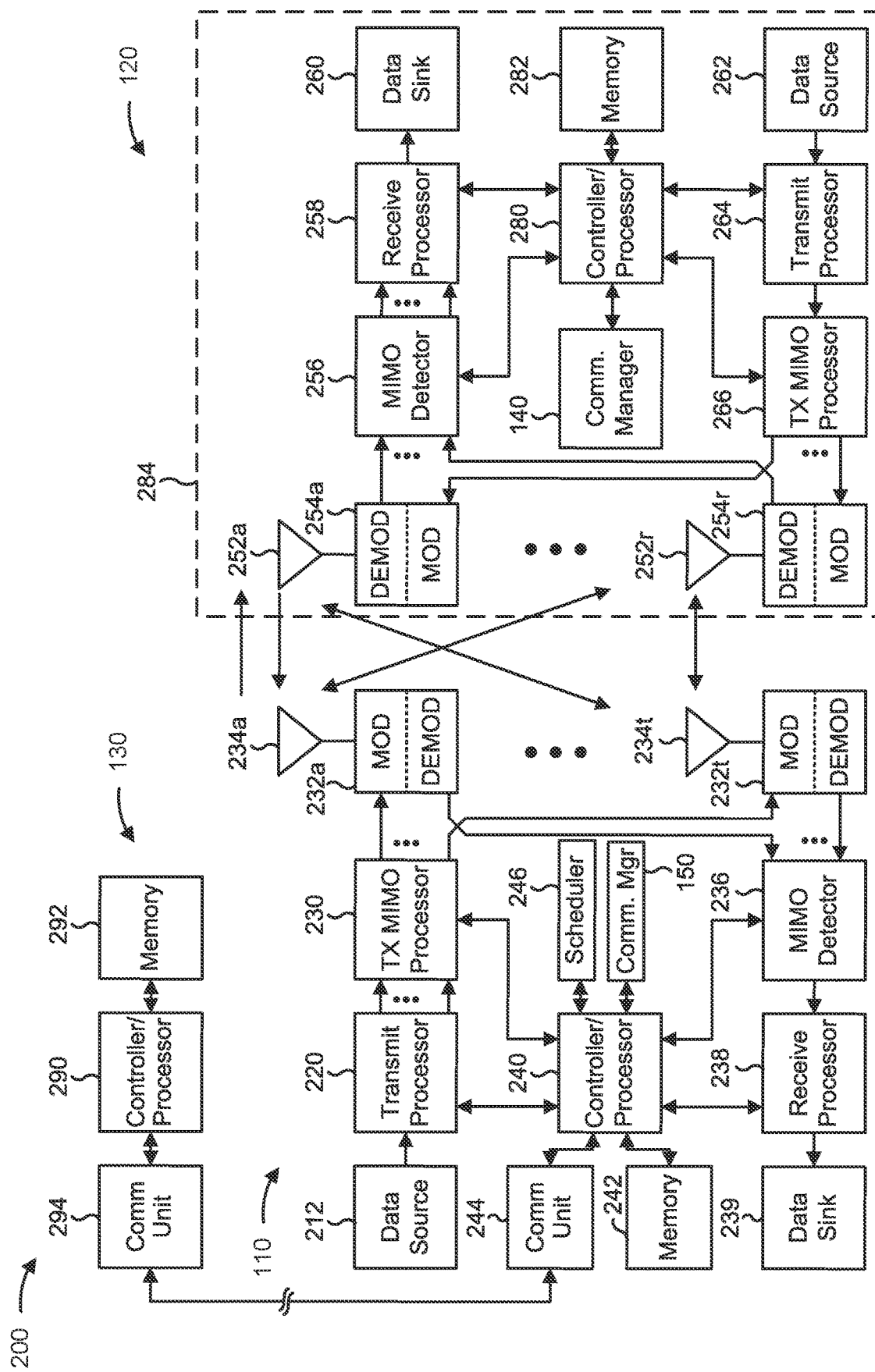
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with transmitting DPD information, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network entity, a CSI-RS; and/or means for transmitting, to the network entity and via a feedback channel, DPD information that is based at least in part on the CSI-RS, wherein the DPD information indicates an estimate of non-linearities of a power amplifier at the network entity based at least in part on the CSI-RS. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting, to a UE, a CSI-RS; and/or means for receiving, from the UE and via a feedback channel, DPD information that is based at least in part on the CSI-RS, wherein the DPD information indicates an estimate of non-linearities of a power amplifier at the network entity based at least in part on the CSI-RS. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
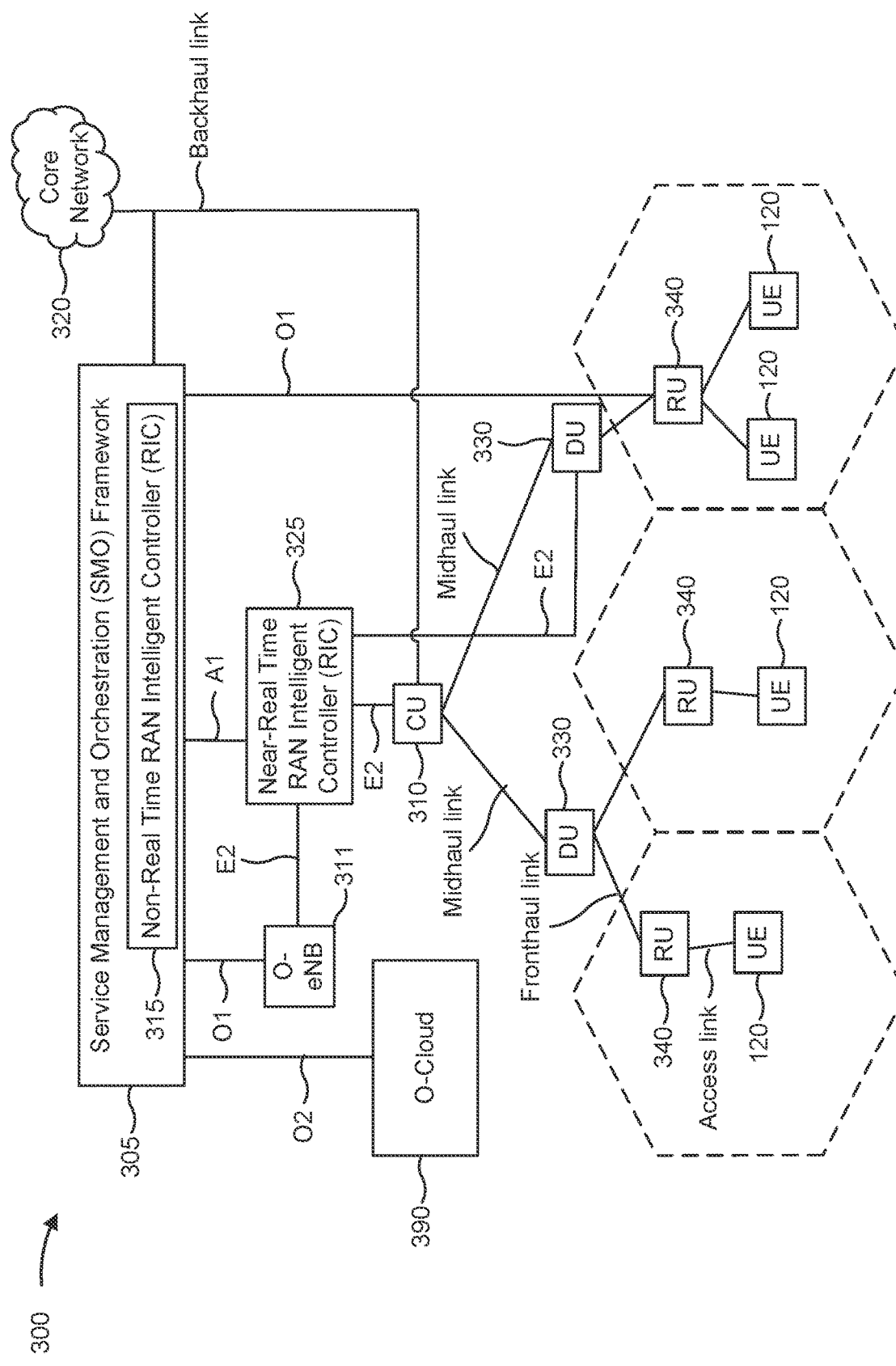
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

DPD is a technique to increase linearity or compensate for non-linearity in power amplifiers. In DPD, an output signal of a power amplifier may be pre-distorted using a non-linearity model associated with the power amplifier. The output signal of the power amplifier may be pre-distorted using the non-linearity model in order to compensate for non-linearities of the power amplifier. DPD may enable activating the power amplifier closer to its saturation point while maintaining a favorable linearity for the power amplifier. DPD may increase a power efficiency of the power amplifier, which may result in power savings at a network entity. OTA DPD may be based at least in part on measurements and/or a kernel selection.

DPD may apply inverse distortion, using a pre-distorter, at an input signal of the power amplifier to cancel distortion generated by the power amplifier. A signal $V_1$ may be provided as an input to the pre-distorter, and the pre-distorter may generate a signal $V_2$ as an output. In other words, the signal $V_1$ may be pre-distorted into signal $V_2$. The signal $V_2$ may be an input to the power amplifier, which may produce signal $V_0$ as an output, where signal $V_0$ may be an amplified version of signal $V_1$. The inverse distortion may be based at least in part on various characteristics of the power amplifier.

A network entity (e.g., a transmitter) may include non-linear components, such as the power amplifier, which may distort transmitted signals. Non-linear distortions may be in-band distortions, which may affect a link performance, or out-band distortions, which may dictate an amount of adjacent channel interference. In order to avoid such distortions, power backoff may be used. When the power backoff is high, a power efficiency may be reduced, and signals may be transmitted with less power.

The network entity may implement DPD as an alternative to, or in addition to, power backoff. With DPD, an amount of distortion may be kept at some target level, while the power backoff may be reduced to be as low as possible, which may improve the power amplifier efficiency. DPD operations may involve signal sensing at an RF circuit. A transmitted signal, from the power amplifier may be received, by a UE (e.g., a receiver), and the transmitted signal may be measured for non-linearities estimation by the UE.

The UE may receive a signal from the network entity, and the UE may perform OTA measurements and feedback of non-linearities of the power amplifier based at least in part on the signal. The UE may measure and estimate a non-linear model of the power amplifier in the network entity. The UE may transmit, to the network entity, a report that indicates measurements and/or estimations of the non-linear model of the power amplifier in the network entity. Based at least in part on the report, the network entity may perform DPD to a signal before the signal is amplified by the power amplifier, which may enable a smaller power backoff of the signal before the signal is provided to the power amplifier. A power efficiency of the power amplifier may be increased, and as a result, the UE may transmit stronger downlink signals to achieve better coverage and/or reduce an amount of power being supplied to the power amplifier, which may result in reduced energy consumption.

In an NR system with multiple antennas, DPD training at the network entity may be challenging due to various attributes, such as beamforming (which may involve linearizing multiple power amplifiers with a single DPD), mutual coupling between power amplifiers in a same layer and across layers, and wide bandwidths with limited oversampling. Further, the UE may not be configured to use specific channels and/or reference signals for the DPD training.

In various aspects of techniques and apparatuses described herein, a UE may receive, from a network entity, a reference signal, such as a CSI-RS. The UE may transmit, to the network entity and via a feedback channel, DPD information that is based at least in part on the reference signal. The UE may transmit the DPD information via a physical uplink shared channel (PUSCH) or a physical uplink control channel (PUCCH). The UE may transmit the DPD information in a periodic manner, in an aperiodic manner, or in a semi-persistent manner. The DPD information may indicate an estimate of non-linearities of a power amplifier at the network entity based at least in part on the reference signal. The network entity may receive the DPD information from the UE. The UE may perform DPD to a signal provided to the power amplifier based at least in part on the DPD feedback information. As a result, the DPD information may be useful for the network entity to achieve linearity at the power amplifier of the network entity.

Figure 4:
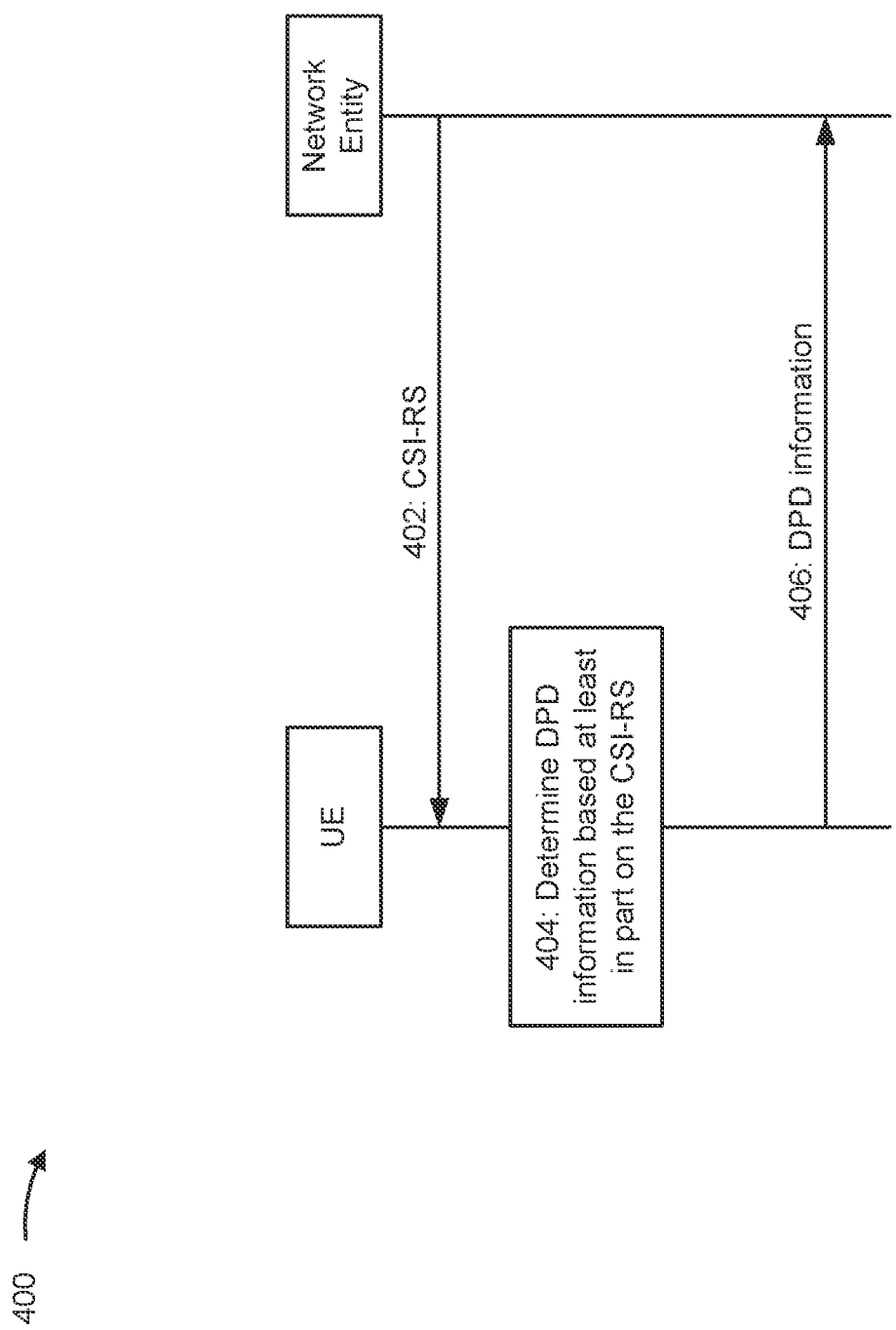
FIG. 4 is a diagram illustrating an example associated with transmitting digital pre-distortion (DPD) information, in accordance with the present disclosure.

FIG. 4 is a diagram illustrating an example 400 associated with transmitting DPD information, in accordance with the present disclosure. As shown in FIG. 4, example 400 includes communication between a UE (e.g., UE 120) and a network entity (e.g., base station 110). In some aspects, the UE and the network entity may be included in a wireless network, such as wireless network 100.

As shown by reference number 402, the UE may receive, from the network entity, a CSI-RS. Alternatively, the UE may receive, from the network entity, a type of reference signal other than a CSI-RS. The UE may receive the CSI-RS in a downlink. The CSI-RS may be specific to DPD. In other words, the network entity may transmit the CSI-RS for DPD training purposes. The CSI-RS may be a training signal to be used to generate DPD information. The CSI-RS may be associated with CSI-RS resources used for beam management.

In some aspects, CSI-RS enhancements may be used to support DPD measurements. In some aspects, in order to evaluate coefficients for the DPD, the CSI-RS for measurements may be transmitted with a relatively low peak-to-average power ratio (PAPR) to create inter-modulations in a power amplifier. In other words, a CSI-RS power boosting may be below a PAPR threshold to introduce inter-modulation. The CSI-RS may be associated with an increased transmit power, where the CSI-RS may be with or without a filtering. In some aspects, the CSI-RS may be associated with a CSI-RS density and/or a rate matching pattern density. Due to the non-linearity of the CSI-RS transmitted in the relatively low PAPR, a non-linear CSI-RS output from the power amplifier when transmitted in existing CSI-RS densities (e.g., one CSI-RS per 12 resource elements (REs), one CSI-RS per 24 REs, or one CSI-RS per four REs) may have energy in even and/or odd (e.g., all even/odd) REs, thereby contaminating physical downlink shared channel (PDSCH) REs since PDSCH may only rate match around CSI-RS REs. The PDSCH may need to rate match around even/odd REs, and thus new rate matching rules and/or a new CSI-RS density may be needed. In some aspects, the CSI-RS may be associated with a different reference signal bandwidth and measurement bandwidth. Due to the non-linearity of the CSI-RS transmitted with the relatively low PAPR, a transmitted envelope may be impaired (e.g., side-lobes of the CSI-RS may exceed an allowed spectral emission mask). The CSI-RS may need to be transmitted in a smaller bandwidth than the measurement bandwidth, which may be enabled using additional rate matching and collision rules with other channels or signals.

As shown by reference number 404, the UE may determine the DPD information based at least in part on the CSI-RS. The DPD information may indicate an estimate of non-linearities of the power amplifier at the network entity based at least in part on the CSI-RS. In other words, the non-linearities of the power amplifier at the network entity may affect the CSI-RS that is transmitted to the UE, and the UE may be able to measure and/or estimate the non-linearities of the power amplifier using the CSI-RS. The CSI-RS may be a training signal for determining the DPD information.

As shown by reference number 406, the UE may transmit, to the network entity and via a feedback channel, the DPD information that is based at least in part on the CSI-RS. The UE may feed back the DPD information to the network entity. The DPD information may indicate the estimate of the non-linearities of the power amplifier, and the DPD information may indicate a formula used for determining the estimate of the non-linearities of the power amplifier. For example, the DPD information may indicate an actual formula that is used in internal feedback of DPD. The network entity may receive the DPD information from the UE. The network entity may perform DPD (and an appropriate level of DPD) to a signal provided to the power amplifier of the network entity based at least in part on the DPD information. As a result, subsequent signals that are transmitted by the network entity may be pre-distorted using DPD, and the level of pre-distortion applied by the network entity may be based at least in part on the DPD information received from the UE. The subsequent signals may be pre-distorted prior to being amplified by the power amplifier, and the pre-distortion may mitigate non-linearities caused by the power amplifier.

In some aspects, the UE may transmit, to the network entity, uplink control information (UCI) via a PUSCH. The UCI transmitted via the PUSCH may indicate the DPD information. In some aspects, the UE may transmit, to the network entity, UCI via a PUCCH. The UCI transmitted via the PUCCH may indicate the DPD information. In some aspects, the UE may transmit the DPD information in a periodic manner. In some aspects, the UE may transmit the DPD information in an aperiodic manner. In some aspects, the UE may transmit the DPD information in a semi-persistent manner.

In some aspects, the UE may transmit, to the network entity, capability signaling that indicates the UE is capable of determining the DPD information based at least in part on the CSI-RS. Not all UEs may be capable of determining DPD information. The capability signaling may indicate that the UE is capable of determining DPD information utilizing training signals (e.g., CSI-RSs) per directed beam with power amplifiers of the network entity. In some aspects, the UE may be associated with a beam of interest for a DPD calculation by the network entity. For example, selected UEs at beams of interest for which DPD calculations are required may be configured to measure training signals (e.g., CSI-RSs received from the network entity). At least one UE (e.g., not all UEs) on each beam may be utilized for providing the DPD information as feedback.

In some aspects, the UE may implement a procedure for reporting the DPD information to the network entity. Actual feedback for DPD training, such as the DPD information, may be defined. The DPD training may be based at least in part on a usage of existing channels for training, such as the CSI-RS, which may be received by the UE in the downlink. The UE may feed back, via the feedback channel, the DPD information based at least in part on the received signals. The received signals (e.g., the CSI-RS) may be training signals, where the UE may measure the training signals and process information (e.g., the DPD information) needed for the network entity to apply DPD. The DPD training may be based at least in part on a usage of existing channels for feedback, such as the PUSCH or the PUCCH, which may be able to carry the uplink UCI that indicates the DPD information. The UE may report the DPD information in the periodic manner, in the aperiodic manner, or in the semi-persistent manner based at least in part on the CSI-RS for DPD.

As indicated above, FIG. 4 is provided as an example. Other examples may differ from what is described with regard to FIG. 4.

Figure 5:
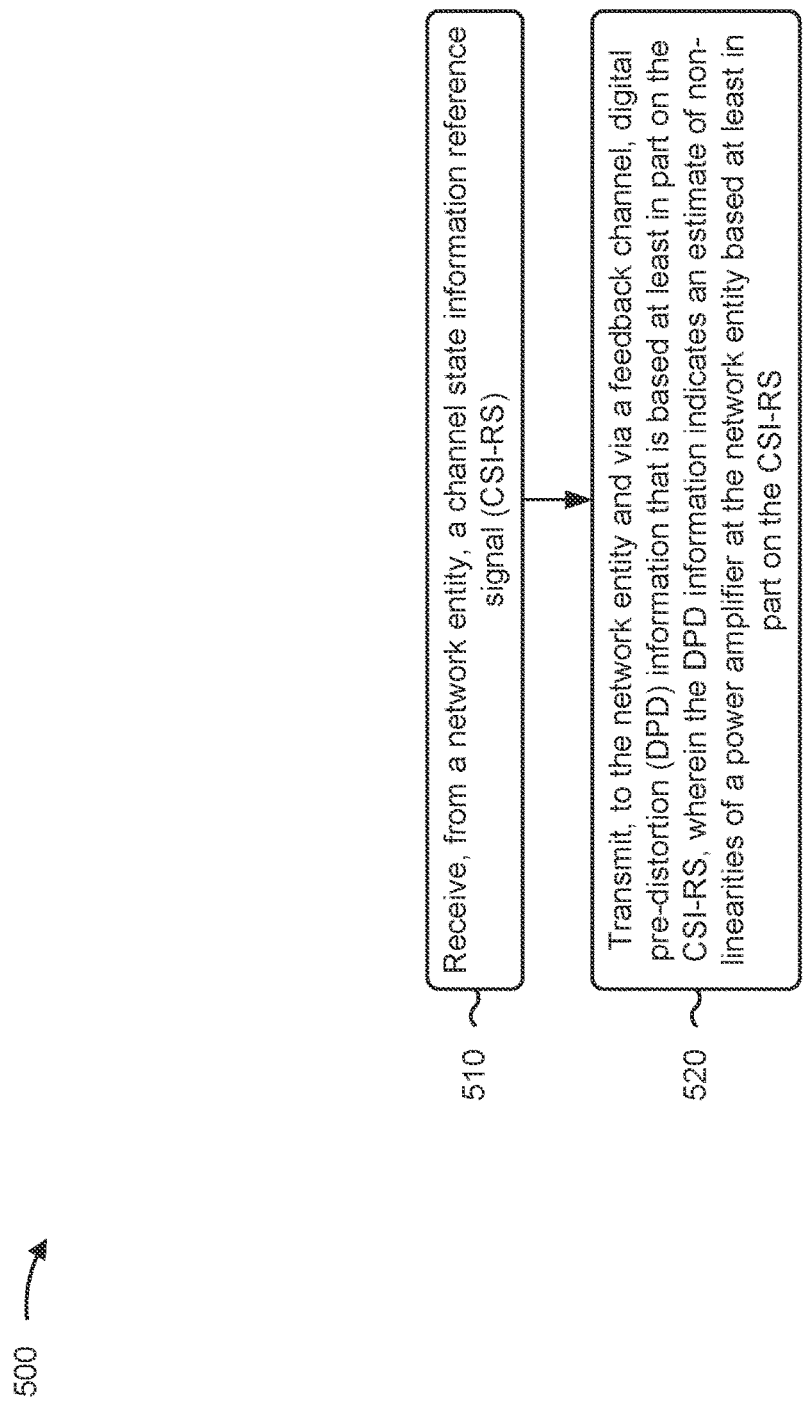
FIGS. 5-6 are diagrams illustrating example processes associated with transmitting DPD information, in accordance with the present disclosure.

FIG. 5 is a diagram illustrating an example process 500 performed, for example, by a UE, in accordance with the present disclosure. Example process 500 is an example where the UE (e.g., UE 120) performs operations associated with techniques for transmitting DPD information.

As shown in FIG. 5, in some aspects, process 500 may include receiving, from a network entity, a CSI-RS (block 510). For example, the UE (e.g., using communication manager 140 and/or reception component 702, depicted in FIG. 7) may receive, from a network entity, a CSI-RS, as described above.

As further shown in FIG. 5, in some aspects, process 500 may include transmitting, to the network entity and via a feedback channel, DPD information that is based at least in part on the CSI-RS, wherein the DPD information indicates an estimate of non-linearities of a power amplifier at the network entity based at least in part on the CSI-RS (block 520). For example, the UE (e.g., using communication manager 140 and/or transmission component 704, depicted in FIG. 7) may transmit, to the network entity and via a feedback channel, DPD information that is based at least in part on the CSI-RS, wherein the DPD information indicates an estimate of non-linearities of a power amplifier at the network entity based at least in part on the CSI-RS, as described above.

Process 500 may include additional aspects, such as any single aspect or any combination of aspects described below and/or in connection with one or more other processes described elsewhere herein.

In a first aspect, process 500 includes transmitting UCI via a PUSCH that indicates the DPD information.

In a second aspect, alone or in combination with the first aspect, process 500 includes transmitting UCI via a PUCCH that indicates the DPD information.

In a third aspect, alone or in combination with one or more of the first and second aspects, process 500 includes determining the DPD information based at least in part on the CSI-RS, wherein the CSI-RS is a training signal for determining the DPD information.

In a fourth aspect, alone or in combination with one or more of the first through third aspects, the DPD information is transmitted in a periodic manner or in an aperiodic manner.

In a fifth aspect, alone or in combination with one or more of the first through fourth aspects, the DPD information is transmitted in a semi-persistent manner.

In a sixth aspect, alone or in combination with one or more of the first through fifth aspects, the CSI-RS is associated with CSI-RS resources used for beam management.

In a seventh aspect, alone or in combination with one or more of the first through sixth aspects, the DPD information indicates a formula used for determining the estimate of the non-linearities of the power amplifier based at least in part on the CSI-RS.

In an eighth aspect, alone or in combination with one or more of the first through seventh aspects, process 500 includes transmitting, to the network entity, capability signaling that indicates the UE is capable of determining the DPD information based at least in part on the CSI-RS.

In a ninth aspect, alone or in combination with one or more of the first through eighth aspects, the UE is associated with a beam of interest for a DPD calculation by the network entity.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
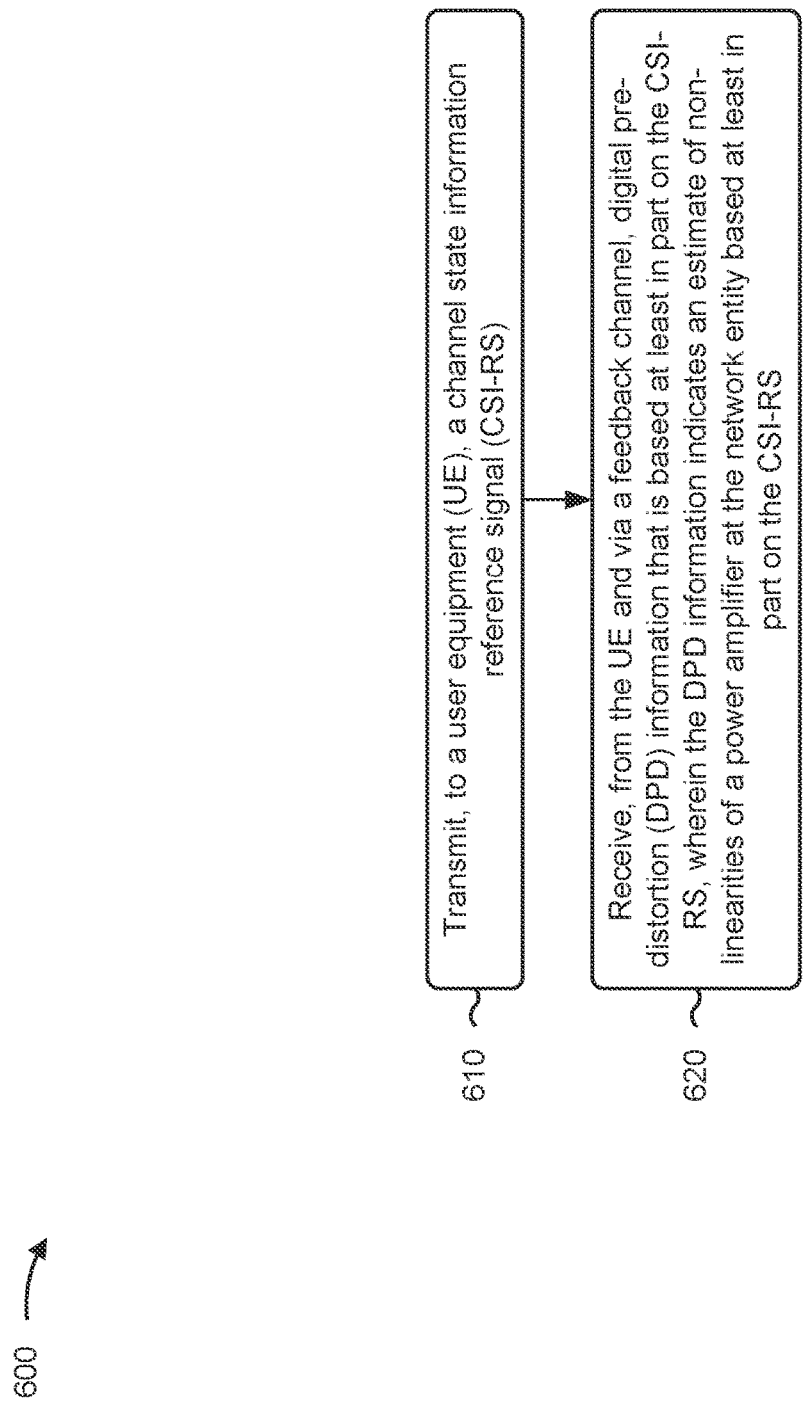

FIG. 6 is a diagram illustrating an example process 600 performed, for example, by a network entity, in accordance with the present disclosure. Example process 600 is an example where the network entity (e.g., base station 110) performs operations associated with techniques for transmitting DPD information.

As shown in FIG. 6, in some aspects, process 600 may include transmitting, to a UE, a CSI-RS (block 610). For example, the network entity (e.g., using communication manager 150 and/or transmission component 804, depicted in FIG. 8) may transmit, to a UE, a CSI-RS, as described above.

As further shown in FIG. 6, in some aspects, process 600 may include receiving, from the UE and via a feedback channel, DPD information that is based at least in part on the CSI-RS, wherein the DPD information indicates an estimate of non-linearities of a power amplifier at the network entity based at least in part on the CSI-RS (block 620). For example, the network entity (e.g., using communication manager 150 and/or reception component 802, depicted in FIG. 8) may receive, from the UE and via a feedback channel, DPD information that is based at least in part on the CSI-RS, wherein the DPD information indicates an estimate of non-linearities of a power amplifier at the network entity based at least in part on the CSI-RS, as described above.

Process 600 may include additional aspects, such as any single aspect or any combination of aspects described below and/or in connection with one or more other processes described elsewhere herein.

In a first aspect, process 600 includes performing DPD to a signal provided to the power amplifier based at least in part on the DPD information.

In a second aspect, alone or in combination with the first aspect, process 600 includes receiving UCI via a PUSCH that indicates the DPD information.

In a third aspect, alone or in combination with one or more of the first and second aspects, process 600 includes receiving UCI via a PUCCH that indicates the DPD information.

In a fourth aspect, alone or in combination with one or more of the first through third aspects, the DPD information is received in a periodic manner or in an aperiodic manner.

In a fifth aspect, alone or in combination with one or more of the first through fourth aspects, the DPD information is received in a semi-persistent manner.

In a sixth aspect, alone or in combination with one or more of the first through fifth aspects, the CSI-RS is associated with CSI-RS resources used for beam management.

In a seventh aspect, alone or in combination with one or more of the first through sixth aspects, the DPD information indicates a formula used for determining the estimate of the non-linearities of the power amplifier based at least in part on the CSI-RS.

In an eighth aspect, alone or in combination with one or more of the first through seventh aspects, process 600 includes receiving, from the UE, capability signaling that indicates the UE is capable of determining the DPD information based at least in part on the CSI-RS.

In a ninth aspect, alone or in combination with one or more of the first through eighth aspects, the UE is associated with a beam of interest for a DPD calculation by the network entity.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
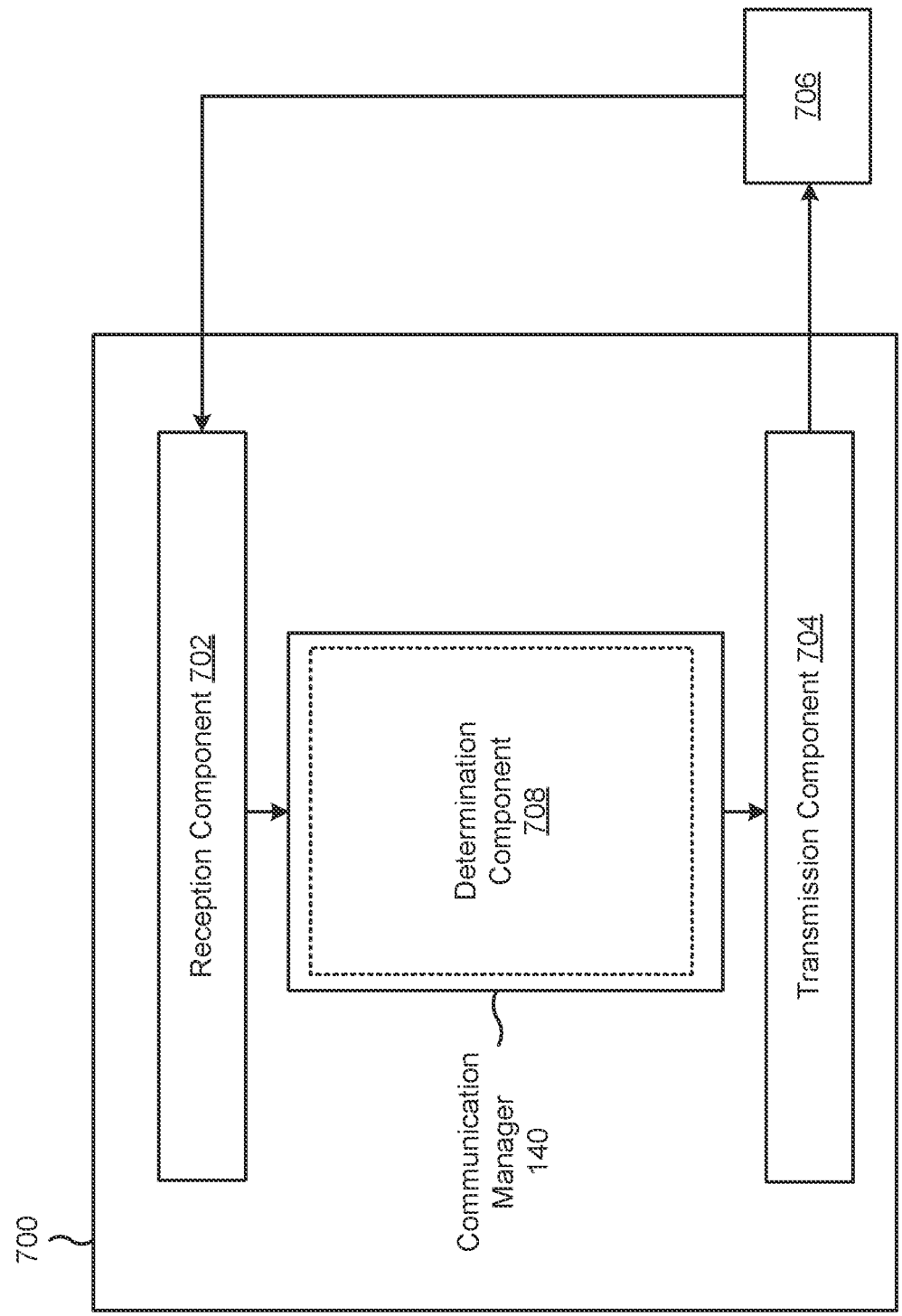
FIGS. 7-8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a determination component 708, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive, from a network entity, a CSI-RS. The transmission component 704 may transmit, to the network entity and via a feedback channel, DPD information that is based at least in part on the CSI-RS, wherein the DPD information indicates an estimate of non-linearities of a power amplifier at the network entity based at least in part on the CSI-RS. The determination component 708 may determine the DPD information based at least in part on the CSI-RS, wherein the CSI-RS is a training signal for determining the DPD information. The transmission component 704 may transmit, to the network entity, capability signaling that indicates the UE is capable of determining the DPD information based at least in part on the CSI-RS.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
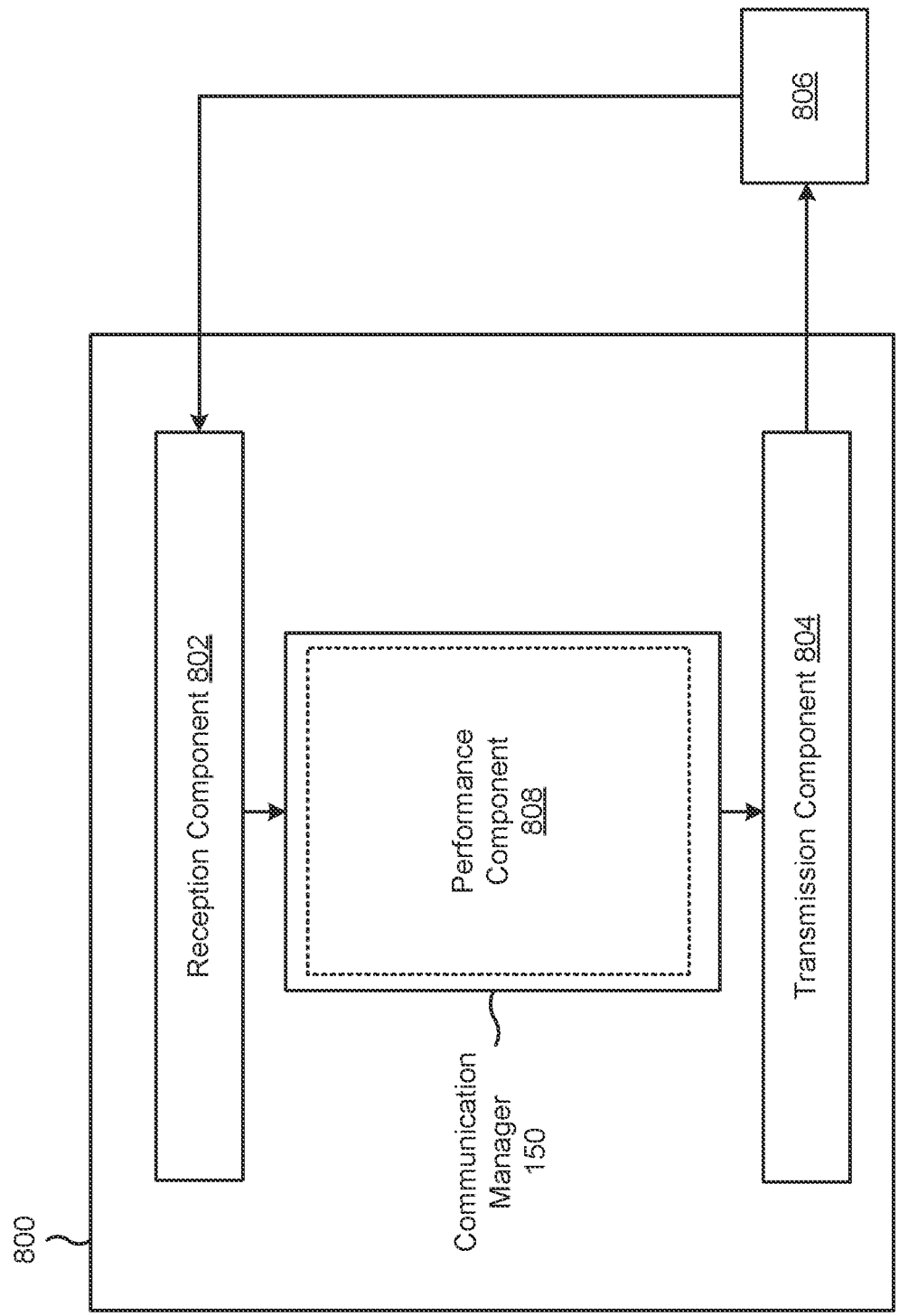

FIG. 8 is a diagram of an example apparatus 800 for wireless communication. The apparatus 800 may be a network entity, or a network entity may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a performance component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the network entity described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the network entity described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processo29ontroltroller/processor, a memory, or a combination thereof, of the network entity described in connection with FIG. 2. In some aspects, the transmission component 804 may be co-located with the reception component 802 in a transceiver.

The transmission component 804 may transmit, to a UE, a CSI-RS. The reception component 802 may receive, from the UE and via a feedback channel, DPD information that is based at least in part on the CSI-RS, wherein the DPD information indicates an estimate of non-linearities of a power amplifier at the network entity based at least in part on the CSI-RS. The performance component 808 may perform DPD to a signal provided to the power amplifier based at least in part on the DPD information. The reception component 802 may receive, from the UE, capability signaling that indicates the UE is capable of determining the DPD information based at least in part on the CSI-RS.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, from a network entity, a channel state information reference signal (CSI-RS); and transmitting, to the network entity and via a feedback channel, digital pre-distortion (DPD) information that is based at least in part on the CSI-RS, wherein the DPD information indicates an estimate of non-linearities of a power amplifier at the network entity based at least in part on the CSI-RS.

Aspect 2: The method of Aspect 1, wherein transmitting the DPD information comprises transmitting uplink control information via a physical uplink shared channel that indicates the DPD information.

Aspect 3: The method of any of Aspects 1 through 2, wherein transmitting the DPD information comprises transmitting uplink control information via a physical uplink control channel that indicates the DPD information.

Aspect 4: The method of any of Aspects 1 through 3, further comprising: determining the DPD information based at least in part on the CSI-RS, wherein the CSI-RS is a training signal for determining the DPD information.

Aspect 5: The method of any of Aspects 1 through 4, wherein the DPD information is transmitted in a periodic manner or in an aperiodic manner.

Aspect 6: The method of any of Aspects 1 through 5, wherein the DPD information is transmitted in a semi-persistent manner.

Aspect 7: The method of any of Aspects 1 through 6, wherein the CSI-RS is associated with CSI-RS resources used for beam management.

Aspect 8: The method of any of Aspects 1 through 7, wherein the DPD information indicates a formula used for determining the estimate of the non-linearities of the power amplifier based at least in part on the CSI-RS.

Aspect 9: The method of any of Aspects 1 through 8, further comprising: transmitting, to the network entity, capability signaling that indicates the UE is capable of determining the DPD information based at least in part on the CSI-RS.

Aspect 10: The method of any of Aspects 1 through 9, wherein the UE is associated with a beam of interest for a DPD calculation by the network entity.

Aspect 11: A method of wireless communication performed by a network entity, comprising: transmitting, to a user equipment (UE), a channel state information reference signal (CSI-RS); and receiving, from the UE and via a feedback channel, digital pre-distortion (DPD) information that is based at least in part on the CSI-RS, wherein the DPD information indicates an estimate of non-linearities of a power amplifier at the network entity based at least in part on the CSI-RS.

Aspect 12: The method of Aspect 11, further comprising: performing DPD to a signal provided to the power amplifier based at least in part on the DPD information.

Aspect 13: The method of any of Aspects 11 through 12, wherein receiving the DPD information comprises receiving uplink control information via a physical uplink shared channel that indicates the DPD information.

Aspect 14: The method of any of Aspects 11 through 13, wherein receiving the DPD information comprises receiving uplink control information via a physical uplink control channel that indicates the DPD information.

Aspect 15: The method of any of Aspects 11 through 14, wherein the DPD information is received in a periodic manner or in an aperiodic manner.

Aspect 16: The method of any of Aspects 11 through 15, wherein the DPD information is received in a semi-persistent manner.

Aspect 17: The method of any of Aspects 11 through 16, wherein the CSI-RS is associated with CSI-RS resources used for beam management.

Aspect 18: The method of any of Aspects 11 through 17, wherein the DPD information indicates a formula used for determining the estimate of the non-linearities of the power amplifier based at least in part on the CSI-RS.

Aspect 19: The method of any of Aspects 11 through 18, further comprising: receiving, from the UE, capability signaling that indicates the UE is capable of determining the DPD information based at least in part on the CSI-RS.

Aspect 20: The method of any of Aspects 11 through 19, wherein the UE is associated with a beam of interest for a DPD calculation by the network entity.

Aspect 21: A method of wireless communication performed by a user equipment (UE), comprising: receiving, from a network entity, a reference signal; and transmitting, to the network entity and via a feedback channel, digital pre-distortion (DPD) information that is based at least in part on the reference signal, wherein the DPD information indicates an estimate of non-linearities of a power amplifier at the network entity based at least in part on the reference signal.

Aspect 22: The method of Aspect 21, wherein transmitting the DPD information comprises transmitting uplink control information via a physical uplink shared channel that indicates the DPD information.

Aspect 23: The method of any of Aspects 21 through 22, wherein transmitting the DPD information comprises transmitting uplink control information via a physical uplink control channel that indicates the DPD information.

Aspect 24: The method of any of Aspects 21 through 23, further comprising: determining the DPD information based at least in part on the reference signal, wherein the reference signal is a training signal for determining the DPD information.

Aspect 25: The method of any of Aspects 21 through 24, wherein the DPD information is transmitted in a periodic manner or in an aperiodic manner.

Aspect 26: The method of any of Aspects 21 through 25, wherein the DPD information is transmitted in a semi-persistent manner.

Aspect 27: The method of any of Aspects 21 through 26, wherein the reference signal is a channel state information reference signal (CSI-RS).

Aspect 28: The method of any of Aspects 21 through 27, wherein the DPD information indicates a formula used for determining the estimate of the non-linearities of the power amplifier based at least in part on the reference signal.

Aspect 29: The method of any of Aspects 21 through 28, further comprising: transmitting, to the network entity, capability signaling that indicates the UE is capable of determining the DPD information based at least in part on the reference signal.

Aspect 30: The method of any of Aspects 21 through 29, wherein the UE is associated with a beam of interest for a DPD calculation by the network entity.

Aspect 31: A method of wireless communication performed by a network entity, comprising: transmitting, to a user equipment (UE), a reference signal; and receiving, from the UE and via a feedback channel, digital pre-distortion (DPD) information that is based at least in part on the reference signal, wherein the DPD information indicates an estimate of non-linearities of a power amplifier at the network entity based at least in part on the reference signal.

Aspect 32: The method of Aspect 31, further comprising: performing DPD to a signal provided to the power amplifier based at least in part on the DPD information.

Aspect 33: The method of any of Aspects 31 through 32, wherein receiving the DPD information comprises receiving uplink control information via a physical uplink shared channel that indicates the DPD information.

Aspect 34: The method of any of Aspects 31 through 33, wherein receiving the DPD information comprises receiving uplink control information via a physical uplink control channel that indicates the DPD information.

Aspect 35: The method of any of Aspects 31 through 34, wherein the DPD information is received in a periodic manner or in an aperiodic manner.

Aspect 36: The method of any of Aspects 31 through 35, wherein the DPD information is received in a semi-persistent manner.

Aspect 37: The method of any of Aspects 31 through 36, wherein the reference signal is a channel state information reference signal (CSI-RS).

Aspect 38: The method of any of Aspects 31 through 37, wherein the DPD information indicates a formula used for determining the estimate of the non-linearities of the power amplifier based at least in part on the reference signal.

Aspect 39: The method of any of Aspects 31 through 38, further comprising: receiving, from the UE, capability signaling that indicates the UE is capable of determining the DPD information based at least in part on the reference signal.

Aspect 40: The method of any of Aspects 31 through 39, wherein the UE is associated with a beam of interest for a DPD calculation by the network entity.

Aspect 41: An apparatus for wireless communication at a device, comprising a processor; memory coupled with the processor; and instructions stored in the memory and executable by the processor to cause the apparatus to perform the method of one or more of Aspects 1-10 or 21-30.

Aspect 42: A device for wireless communication, comprising a memory and one or more processors coupled to the memory, the one or more processors configured to perform the method of one or more of Aspects 1-10 or 21-30.

Aspect 43: An apparatus for wireless communication, comprising at least one means for performing the method of one or more of Aspects 1-10 or 21-30.

Aspect 44: A non-transitory computer-readable medium storing code for wireless communication, the code comprising instructions executable by a processor to perform the method of one or more of Aspects 1-10 or 21-30.

Aspect 45: A non-transitory computer-readable medium storing a set of instructions for wireless communication, the set of instructions comprising one or more instructions that, when executed by one or more processors of a device, cause the device to perform the method of one or more of Aspects 1-10 or 21-30.

Aspect 46: An apparatus for wireless communication at a device, comprising a processor; memory coupled with the processor; and instructions stored in the memory and executable by the processor to cause the apparatus to perform the method of one or more of Aspects 11-20 or 31-40.

Aspect 47: A device for wireless communication, comprising a memory and one or more processors coupled to the memory, the one or more processors configured to perform the method of one or more of Aspects 11-20 or 31-40.

Aspect 48: An apparatus for wireless communication, comprising at least one means for performing the method of one or more of Aspects 11-20 or 31-40.

Aspect 49: A non-transitory computer-readable medium storing code for wireless communication, the code comprising instructions executable by a processor to perform the method of one or more of Aspects 11-20 or 31-40.

Aspect 20: A non-transitory computer-readable medium storing a set of instructions for wireless communication, the set of instructions comprising one or more instructions that, when executed by one or more processors of a device, cause the device to perform the method of one or more of Aspects 11-20 or 31-40.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a network entity, a reference signal; and
   transmitting, to the network entity and via a feedback channel, digital pre-distortion (DPD) information that is based at least in part on the reference signal, wherein the DPD information indicates an estimate of non-linearities of a power amplifier at the network entity based at least in part on the reference signal.

2. The method of claim 1, wherein transmitting the DPD information comprises transmitting uplink control information via a physical uplink shared channel that indicates the DPD information.

3. The method of claim 1, wherein transmitting the DPD information comprises transmitting uplink control information via a physical uplink control channel that indicates the DPD information.

4. The method of claim 1, further comprising:
   determining the DPD information based at least in part on the reference signal, wherein the reference signal is a training signal for determining the DPD information.

5. The method of claim 1, wherein the DPD information is transmitted in a periodic manner or in an aperiodic manner.

6. The method of claim 1, wherein the DPD information is transmitted in a semi-persistent manner.

7. The method of claim 1, wherein the reference signal is a channel state information reference signal (CSI-RS).

8. The method of claim 1, wherein the DPD information indicates a formula used for determining the estimate of the non-linearities of the power amplifier based at least in part on the reference signal.

9. The method of claim 1, further comprising:
   transmitting, to the network entity, capability signaling that indicates the UE is capable of determining the DPD information based at least in part on the reference signal.

10. The method of claim 1, wherein the UE is associated with a beam of interest for a DPD calculation by the network entity.

11. A method of wireless communication performed by a network entity, comprising:

transmitting, to a user equipment (UE), a reference signal; and receiving, from the UE and via a feedback channel, digital pre-distortion (DPD) information that is based at least in part on the reference signal, wherein the DPD information indicates an estimate of non-linearities of a power amplifier at the network entity based at least in part on the reference signal.

12. The method of claim 11, further comprising:
performing DPD to a signal provided to the power amplifier based at least in part on the DPD information.

13. The method of claim 11, wherein receiving the DPD information comprises receiving uplink control information via a physical uplink shared channel that indicates the DPD information.

14. The method of claim 11, wherein receiving the DPD information comprises receiving uplink control information via a physical uplink control channel that indicates the DPD information.

15. The method of claim 11, wherein the DPD information is received in a periodic manner or in an aperiodic manner.

16. The method of claim 11, wherein the DPD information is received in a semi-persistent manner.

17. The method of claim 11, wherein the reference signal is a channel state information reference signal (CSI-RS).

18. The method of claim 11, wherein the DPD information indicates a formula used for determining the estimate of the non-linearities of the power amplifier based at least in part on the reference signal.

19. The method of claim 11, further comprising:
receiving, from the UE, capability signaling that indicates the UE is capable of determining the DPD information based at least in part on the reference signal.

20. The method of claim 11, wherein the UE is associated with a beam of interest for a DPD calculation by the network entity.

21. An apparatus for wireless communication at a user equipment (UE), comprising:
a memory; and
one or more processors, coupled to the memory, configured to:
receive, from a network entity, a reference signal; and
transmit, to the network entity and via a feedback channel, digital pre-distortion (DPD) information that is based at least in part on the reference signal, wherein the DPD information indicates an estimate of non-linearities of a power amplifier at the network entity based at least in part on the reference signal.

22. The apparatus of claim 21, wherein the one or more processors, to transmit the DPD information, are configured to:
transmit uplink control information via a physical uplink shared channel that indicates the DPD information; or
transmit uplink control information via a physical uplink control channel that indicates the DPD information.

23. The apparatus of claim 21, wherein the one or more processors are further configured to:
determine the DPD information based at least in part on the reference signal, wherein the reference signal is a training signal for determining the DPD information.

24. The apparatus of claim 21, wherein the one or more processors are configured to:
transmit the DPD information in a periodic manner or in an aperiodic manner; or
transmit the DPD information in a semi-persistent manner.

25. The apparatus of claim 21, wherein:
the reference signal is a channel state information reference signal (CSI-RS); or
the DPD information indicates a formula used for determining the estimate of the non-linearities of the power amplifier based at least in part on the reference signal.

26. The apparatus of claim 21, wherein the one or more processors are further configured to:
transmit, to the network entity, capability signaling that indicates the UE is capable of determining the DPD information based at least in part on the reference signal.

27. An apparatus for wireless communication at a network entity, comprising:
a memory; and
one or more processors, coupled to the memory, configured to:
transmit, to a user equipment (UE), a reference signal; and
receive, from the UE and via a feedback channel, digital pre-distortion (DPD) information that is based at least in part on the reference signal, wherein the DPD information indicates an estimate of non-linearities of a power amplifier at the network entity based at least in part on the reference signal.

28. The apparatus of claim 27, wherein the one or more processors are further configured to:
perform DPD to a signal provided to the power amplifier based at least in part on the DPD information.

29. The apparatus of claim 27, wherein the one or more processors, to receive the DPD information, are configured to:
receive uplink control information via a physical uplink shared channel that indicates the DPD information; or
receive uplink control information via a physical uplink control channel that indicates the DPD information.

30. The apparatus of claim 27, wherein the one or more processors are further configured to:
receive, from the UE, capability signaling that indicates the UE is capable of determining the DPD information based at least in part on the reference signal.

* * * * *